G. HOMFRAY.
MACHINE FOR CUTTING COILED BARS FOR CHAIN LINKS.
No. 62,488.  Patented Feb. 26, 1867.
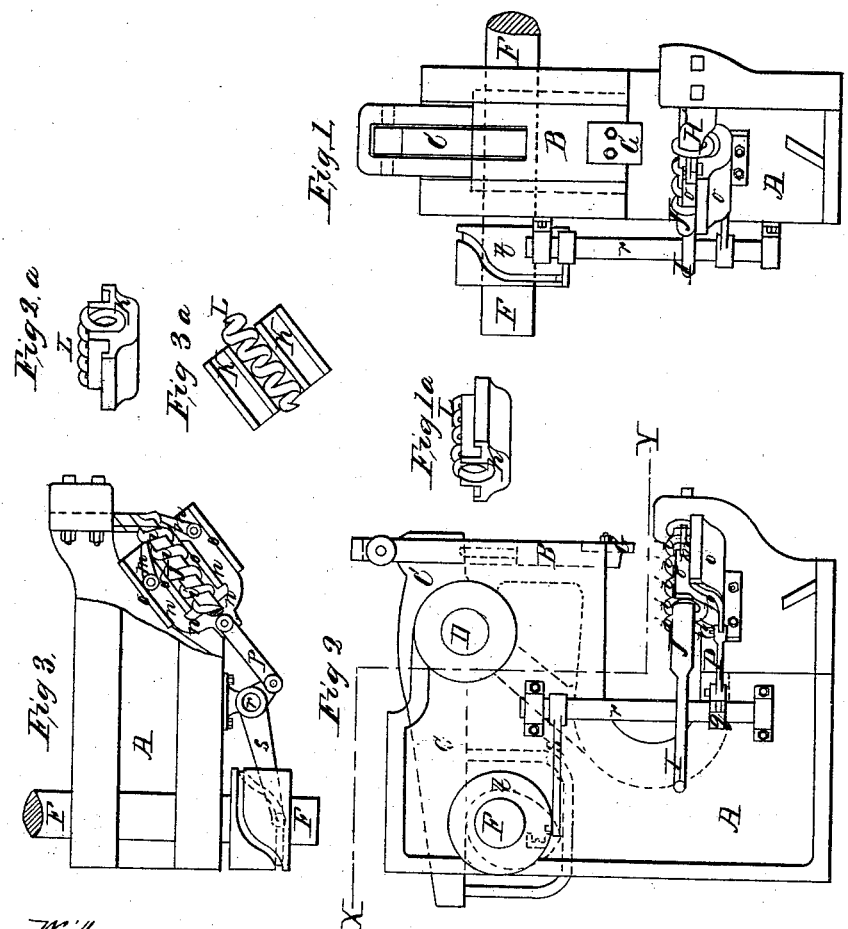

United States Patent Office.

GEORGE HOMFRAY, OF PARISH HALESOWEN, ENGLAND.

Letters Patent No. 62,488, dated February 26, 1867.

---

IMPROVEMENT IN MACHINES FOR CUTTING COILED BARS FOR CHAIN LINKS.

---

*The Schedule referred to in these Letters Patent and making part of the same.*

---

TO ALL WHOM IT MAY CONCERN:

Be it known that I, GEORGE HOMFRAY, of Witley Lodge, in the parish of Halesowen, in the county of Worcester, England, have invented a new and improved Mode of Cutting Coils of Rods or Bars to form Chain Links preparatory to welding the same; and I do hereby declare the following to be a full and exact description thereof, which will enable others skilled in the art to make and use the same, reference being had to the accompanying drawings, forming part of this specification, wherein—

Figure 1 is a front elevation.
Figure 2 is a side elevation.
Figure 3 is a top view on the line $x\,y$; and
Figure $1^a$, fig. $2^a$, and fig. $3^a$ are similar elevations and views of a portion of the machinery differently arranged.

The letters of reference indicate in all the views similar parts.

The coil of rod or bar to be cut into link blanks preparatory for welding is of the kind described, and may be made in the manner set forth in my application for Letters Patent of the United States, for "a new and improved mode for preparing iron or steel rods or bars to form chain links;" and the machine employed is in the main that in common use for shearing iron or other metals, with certain modifications of the cutters or knives, the addition of supporting mandrels or troughs for carrying the coils, and the addition of feeding apparatus for supplying the coils to the cutters or knives; in which modifications my invention consists and which I now proceed to describe.

The drawings show the principal parts of a shearing machine, where A is the body of the machine, B is the sliding or movable head, C is the lever, D is the fulcrum of the lever, E is a cam which actuates the lever, F is the cam or main shaft, G is the upper knife or cutter, and H is the lower knife or cutter. In these portions, (except in the lower knife or cutter H, and attachment of H to the body A,) as shown, there is nothing novel or unusual, and any other arrangement of shearing machine which shall actuate the knives or cutters will answer equally well. The new and improved portions of the machine consist of the bar I, which terminates in the mandrel J, the end at I being supported by some outside support, and that at J being attached (by a socket or otherwise) to the lower cutter H; or, as a substitute for I and J, may be used the trough K, which can be attached to the body A of the machine or otherwise supported so as to have the proper position with regard to the cutter H. Upon this mandrel J, or within the trough K, is placed the coil L of rod or bar. The mandrel J or the trough K is to be fixed in a diagonal position, as shown on fig. 3 and fig. $3^a$, so that the cut of the coil L shall form the proper scarf when any convolution of the coil which has been cut off for a link blank is closed before welding. The cutter H requires to be so made, as shown in the drawing, that each convolution or link blank, when cut off by the action of the upper cutter G, shall drop off or be free to be removed. The new and improved portions of the machine consist further in the feeding apparatus, wherein the pawls $m\,m'$ are attached to the frame $n\,n$, which frame slides in the guide-box $o$ or in grooves in the top of the trough K, the whole having the proper movement with regard to the time of the movement of the cutter G, whereby the pawls $m\,m$, resting upon the coil L, push it forward on the mandrel J or in the trough K, one convolution each movement of the cutter G. The arrangement shown in the drawing for this purpose consists of the link $p$, which connects the slide $n$ to the working-arm $q$ on the rocker-shaft $r$, to which is attached a second rocking-arm $s$, the end of the latter running in a groove in the cam $t$ on the main cam-shaft F.

What I claim as my invention, and desire to secure by Letters Patent, is—

Guiding, directing, and feeding up the bent coil in a line oblique to the cutting edges of the cutter so that the links or sections may be cut off with scarfed edges, when said guiding, feeding, and cutting off are accomplished by an arrangement of devices substantially as described.

I also claim, in combination with the trough and mandrel, a pawl or pawls for feeding the bent rod to the cutters, and holding it in proper position against the action of the cutters, substantially as described.

I also claim the grooving or sloping of the under cutter and its stock, or part to which it is attached, so that the cut off blank, link, or section will drop or be free to be removed from the place where it is cut off, substantially as represented and described.

GEORGE HOMFRAY.

Witnesses:
THOMAS H. DUDLEY, *United States Consul, Liverpool.*
JNO. COLVIN, *Clerk United States Consulate, Liverpool.*